INVENTOR.
JACQUES HENRY-BAUDOT
BY Charles A. Blank
ATTORNEY

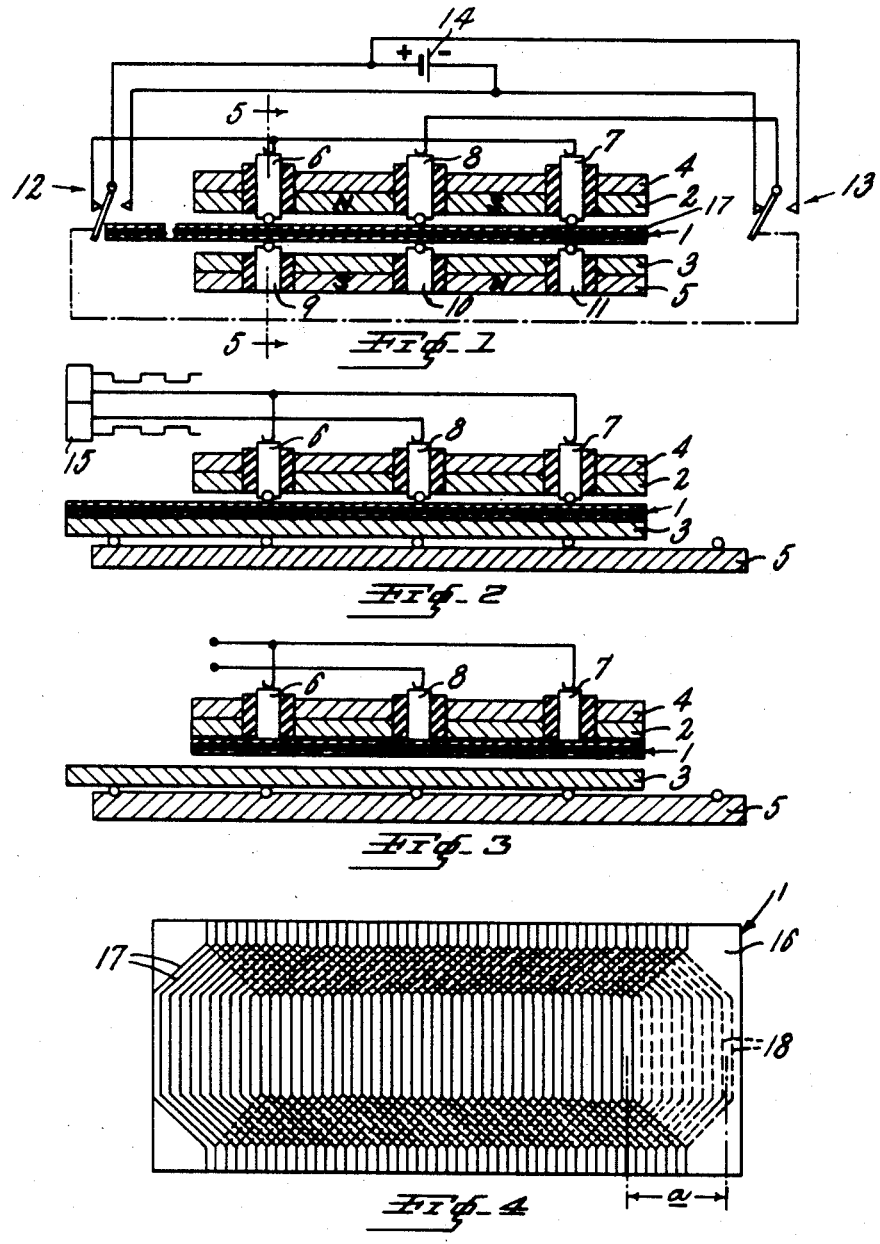

United States Patent Office 3,136,934
Patented June 9, 1964

3,136,934
RECIPROCATING LINEAR MOTOR SYSTEM
Jacques Henry-Baudot, Antony, France, assignor to Printed Motors, Inc., New York, N.Y., a corporation of Delaware
Filed Mar. 7, 1961, Ser. No. 93,885
Claims priority, application France Mar. 31, 1960
7 Claims. (Cl. 318—130)

The present invention relates to electromechanical energy converters and, more particularly, to converters of the type comrpising a magnetic structure with a pair of elongated members defining an air gap and having an elongated member carrying a winding introduced in the air gap and fed with current. An electromechanical energy converter of this type and methods of manufacture have been described and claimed in copending application Serial No. 800,254, filed March 18, 1959 by Burr for Electromechanical Energy Converter and Method of Making Member Thereof, now abandoned and in application Serial No. 26,620 filed May 3, 1960, by Henry-Baudot, now Patent No. 3,109,113, October 29, 1963, for "Improvements in Electro Technical Machines."

In the aforesaid patent applications, the winding described is in the form of an endless band, while the present invention is directed to a converter in which the winding is bounded longitudinally and transversely and may be a rigid, flat card particularly suitable for reciprocating motion.

It is an object of the invention to provide a new and improved electromechanical energy converter in which a reciprocating or alternating motion of a displaceable member is provided.

In accordance with the invention, an electromechanical energy converter comprises means for supplying a magnetic field across an elongated air gap. The converter includes an armature comprising an elongated, flat, card-like support having longitudinal and transverse boundaries and having flat conductors adhering thereto forming a continuous winding along said support between said boundaries and disposed in said air gap. The converter also includes terminal means for supplying current of two polarities to said winding to cause one of said field-supply means and said armature to move in one direction in response to current of one polarity and to move in the opposite direction in response to current of the other polarity.

For a better understanding of the present invention, together with other and further objects thereof, reference is made to the following description and its scope will be pointed out in the appended claims.

Referring now to the drawings:

FIG. 1 represents, in longitudinal section, a motor constructed in accordance with the invention;

FIG. 2 represents, in longitudinal section, a motor constructed in accordance with a modified form of the invention;

FIG. 3 represents, in longitudinal section, a motor constructed in accordance with another form of the invention;

FIG. 4 represents, to an enlarged scale, an armature for use in the motors of FIGS. 1–3;

Figure 5:
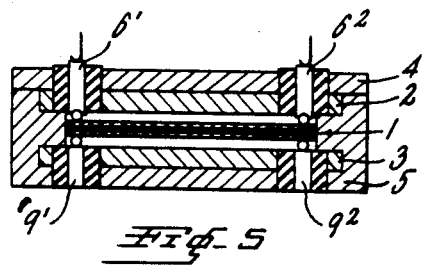
FIG. 5 represents, in transverse section, a possible structure of the FIG. 1 embodiment.

In the drawings, the armature is designated by the reference numeral 1 and, as will be explained, may be movable or stationary. The armature comprises an insulating elongated support 16 (see FIG. 4) on opposite faces of which are formed flat copper conductors adhering intimately thereto. Conductors 17 on one face and conductors 18 on the other face have two sets of half turns of a printed-circuit winding, preferably of an imbricated or lap type. In the case of a series wave winding, it would be necessary to provide lateral returns to close the said winding. The extremities of the half-turn conductors have connections between faces, passing through the insulating support or across the same. Each conductor has a transverse portion and inclined parts defining the step of the winding. The winding may be made by any well known printed-circuit technique. The manufacture of such windings has been described in the aforesaid copending applications.

In the FIG. 1 embodiment, the armature is a rigid card serving as a movable member for the apparatus. The card is made rigidly appropriate choice of the nature and thickness of the insulating support 16. The armature is bordered by two magnetic members, shown in the form of plates 2 and 3, respectively, carried by the plates of the mount 4 and 5. At least one of the magnetic plates 2 and 3 is of magnetic material of high permeability, such as a hard ferrite, and the magnetic poles are formed by suitable pole pieces. These poles are of opposite polarities alternating along the passage of the air gap and, when they are provided on both sides of the air gap, their polarities are also opposite on opposite sides of the air gap, see FIG. 1 where the structure includes a pair of poles on each side of the air gap.

In the FIG. 2 embodiment, the armature 1 and the plate 3 are attached and form together the movable member of the apparatus. The plate 3 is an unmagnetized soft iron plate of magnetic material to close the path for flux generated by the permanently magnetized plate 2.

In the FIG. 3 embodiment, the armature 1 is attached to the plate 2, and the plate 3 forms the movable member of the arrangement. Plate 3 is a permanent magnet with poles impressed on itself. In the FIG. 1 embodiment, only one of the two plates need be permanently magnetized. The other may be an unmagnetized soft iron plate. Also, one could substitute for each plate a structure with projecting magnetic poles.

In the FIG. 2 and 3 embodiments, the insulating support 16 of the winding is not necessarily rigid since it is attached to and supported mechanically by the magnetic structure which is rigid in itself. The winding may be insulated electrically from the magnetic member by any suitable means, such as a thin sheet of insulating material.

To feed current to the armature winding, brushes are utilized since the armature may be movable within the apparatus. Because the winding is of the lap type, it is advantageous to utilize the maximum number of brushes possible within the magnetic structure to make the maximum number of winding sections participate in the electromagnetic action. The number of terminals when the winding is selected is chosen accordingly. There are indicated three brush terminals (FIGS. 1 and 2) and three tap terminals (FIG. 3) 6, 7 and 8 with terminal 8 positioned between terminals 6 and 7, and with terminals 6 and 7 being electrically a common feed terminal. Adjacent terminals 6 and 7 and adjacent terminals 7 and 8 preferably have a spacing substantially equal to the loop width $a$ of the winding of the armature, which preferably is substantially equal to the center-to-center spacing between adjacent magnetic poles.

As indicated in FIG. 5, each brush terminal preferably has two sections $6^1$ and $6^2$. This permits a better balance of pressure of brushes on the winding for guiding the moving armature in the apparatus. The double brushes are electrically connected together. Moreover, they preferably bear on the inclined portions of conductors of the winding to improve the commutation.

In the FIG. 5 embodiment as well as in the FIG. 1 apparatus, there is provided means for guiding the moving armature comprising the brushes on one side of the armature and bearings or guides $9^1$ and $9^2$ (FIG. 5) and 9, 10, 11 (FIG. 1) on the other side of the armature. One can also utilize, as in the FIG. 6 apparatus, lateral tracks 19 and 20 as guides. The plate 3 can then be mounted in a recess in base plate 5.

Figure 6:
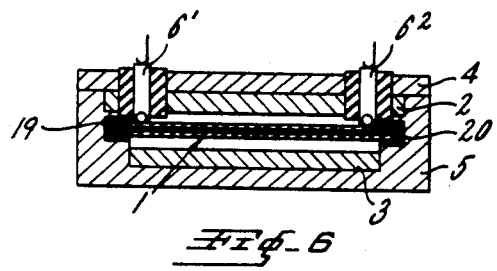
FIG. 6 represents, in transverse section, another possible structure of the FIG. 1 embodiment, from which corresponding structures for the FIG. 2 embodiment will be apparent.

The composite movable member 1, 3 of FIG. 2 can also be guided either as in FIG. 5 or as in FIG. 6 as well as on the bearings indicated in FIG. 2. The movable member 3 of the FIG. 3 embodiment can also be disposed in lateral guide tracks or on bearings on the mounting plate as indicated.

Figure 7:
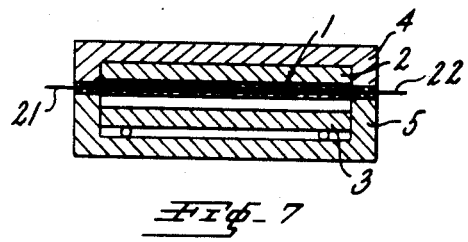
FIG. 7 is a view, in transverse section, of a possible structure of the FIG. 3 embodiment.
Figure 8:
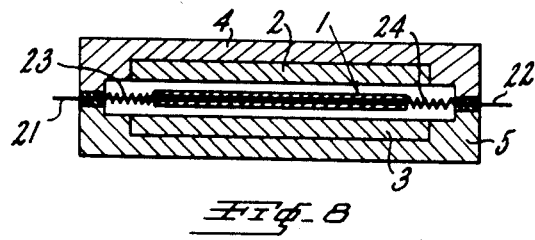
FIG. 8 is a view, in transverse section, of a possible structure of the FIG. 1 embodiment in the case where the movable member has only a very limited length of motion. From this example, corresponding structures for the embodiments of FIGS. 2 and 3 will be apparent.

Feeding of the winding of an embodiment such as the FIG. 3 embodiment can be simplified by substituting for terminals 6–8 flat connections such as 21 and 22 between the mounting plates 4 and 5, FIG. 7. When the displacement of the movable member must be very small, one can support the movable member on conductive springs 23 and 24 and, as indicated, utilize these springs as current conductors, connected to terminals 21 and 22 of the FIG. 8 embodiment.

As previously stated, apparatus constructed in accordance with the invention provides reciprocating movements of the displaceable member. This motion is, in general, obtained by inversions of the sense of the current in the winding. In the case of short displacements (FIG. 8), however, the springs of support of the movable member can be utilized when recoiling during current interruptions to supply motion in one direction, and no inversion of the sense of the current is then necessary.

For the longer displacements, the inversions of the sense of the current within the winding may be automatically controlled by the displacement of the movable member, or the inversion control may be external to the apparatus. There is indicated an example of an automatic control in FIG. 1 and an example of an external control in FIG. 2.

The automatic control of FIG. 1 has recourse to a pair of switches 12 and 13 which are mechanically ganged and which are pushed alternately by the extremities of the armature. The changes of position of the contacts assure the inversions within the armature winding of the sense of the current, supplied, for example, by battery 14. One extremity of the armature 1 pushes the switches 12 and 13 to their left contacts, where they remain until the other extremity of the armature pushes the switch members to their right contacts.

The external control apparatus of FIG. 2 utilizes apparatus 15 having two terminals which deliver currents of complementary wave form, as represented in the drawing. The apparatus 15 can be a multivibrator where a permanent control of alternating movement is provided for the apparatus, or a one-shot multivibrator or a bistable multivibrator ("flip-flop") commanded to change condition when desired, from which semi-aperiodic or aperiodic control may be supplied to the apparatus.

While there have been described what are at present considered to be the preferred embodiments of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. An electromechanical energy converter comprising: means for supplying a magnetic field across an elongated air gap; an armature comprising an elongated, flat, card-like support having longitudinal and transverse boundaries and having flat conductors adhering thereto forming a continuous winding along said support between said boundaries and disposed in said air gap; and means for supplying current of two polarities to said winding to cause one of said field-supply means and said armature to move in one direction in response to current of one polarity and to move in the opposite direction in response to current of the other polarity.

2. An electromechanical energy converter comprising: means for supplying a magnetic field across an elongated air gap; an armature comprising an elongated, flat, card-like support having longitudinal and transverse boundaries and having flat conductors adhering thereto forming a continuous winding along said support between said boundaries and disposed in said air gaps; and means for supplying current of two polarities to said winding to cause said armature to move in one direction in response to current of one polarity and to move in the opposite direction in response to current of the other polarity.

3. An electromechanical energy converter comprising: two adjacent pairs of magnetic poles for supplying a magnetic field across an elongated air gap; an armature comprising an elongated, flat, card-like support having longitudinal and transverse boundaries and having transverse flat conductors adhering thereto forming a continuous lap winding having a predetermined loop width substantially equal to the center-to-center spacing of said pairs of poles; and three electrical terminals having a spacing substantially equal to said predetermined loop width for supplying current to said winding to cause one of said armature and said pairs of poles to move reciprocally with respect to the other.

4. An electromechanical energy converter comprising: means for supplying a magnetic field across an elongated air gap; an armature comprising an elongated, flat, card-like, rigid support having longitudinal and transverse boundaries and having flat conductors adhering thereto forming a continuous winding along said support between said boundaries and disposed in said air gap; and means for supplying current to said winding including direct-current supply means and a pair of switches coupled thereto and disposed at the ends of the travel path of said armature and actuated by said armature for supplying an alternating current to said winding to cause said armature to move reciprocally with respect to said field-supply means.

5. An electromechanical energy converter comprising: means for supplying a magnetic field across an elongated air gap; an armature comprising an elongated, flat, card-like, rigid insulating support having longitudinal and transverse boundaries and having flat conductors adhering thereto forming a continuous winding along said support between said boundaries and disposed in said air gap; and means for supplying current of two polarities to said winding including resilient members for movably supporting said armature to cause said armature to move in one direction in response to current of one polarity and to move in the opposite direction in response to current of the other polarity.

6. An electromechanical energy converter comprising: means including an elongated movable magnetic member having a magnetized region and a stationary member for supplying a magnetic field across an elongated air gap; an armature comprising an elongated, flat, card-like support attached to said stationary member and having longitudinal and transverse boundaries and having flat conductors adhering thereto forming a continuous winding along said support and between said boundaries and disposed in said air gap; and means for supplying current of two polarities to said winding to cause said magnetic member to move in one direction in response to current of one polarity and to move in the opposite direction in response to current of the other polarity.

7. An electromechanical energy converter comprising: two adjacent pairs of magnetic poles of opposite polarity for supplying a magnetic field across an elongated air gap; an armature comprising an elongated, flat, card-like, rigid insulating support having longitudinal and transverse boundaries and having flat conductors with substantially parallel transverse portions adhering to said support and forming a continuous lap winding having a predetermined loop width substantially equal to the center-to-center spacing of said pairs of poles; and three electrical terminals positioned along said air gap near the edges of said poles with alternate terminals being electrically interconnected and having a spacing substantially equal to said predetermined loop width for supplying alternating current to said winding to cause said armature to move reciprocally with respect to said poles.

References Cited in the file of this patent

UNITED STATES PATENTS

| | | |
|---|---|---|
| 561,899 | Leffler | June 9, 1896 |
| 2,666,879 | Godsey | Jan. 19, 1954 |
| 2,831,131 | Klotz | Apr. 15, 1958 |
| 2,970,238 | Swiggett | Jan. 31, 1961 |

FOREIGN PATENTS

| | | |
|---|---|---|
| 805,223 | Great Britain | Dec. 3, 1958 |
| 1,234,294 | France | May 16, 1960 |